United States Patent
Kasai (10) Patent No.: US 9,467,577 B2
(45) Date of Patent: Oct. 11, 2016

(54) IMAGE PROCESSING DEVICE AND IMAGE FORMING APPARATUS

(71) Applicant: KYOCERA Document Solutions Inc., Osaka (JP)

(72) Inventor: Rie Kasai, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/691,718

(22) Filed: Apr. 21, 2015

(65) Prior Publication Data

US 2015/0310318 A1 Oct. 29, 2015

(30) Foreign Application Priority Data

Apr. 23, 2014 (JP) ................... 2014-089666

(51) Int. Cl.
| | |
|---|---|
| G06K 9/36 | (2006.01) |
| H04N 1/00 | (2006.01) |
| G06K 9/00 | (2006.01) |
| H04N 1/387 | (2006.01) |
| G06K 15/02 | (2006.01) |
| G06K 9/20 | (2006.01) |

(52) U.S. Cl.
CPC ........ *H04N 1/00* (2013.01); *G06K 9/00* (2013.01); *G06K 9/00463* (2013.01); *H04N 1/3875* (2013.01); *G06K 15/1872* (2013.01)

(58) Field of Classification Search
CPC ............... G06K 15/1813; G06K 15/1827; G06K 15/1843; G06K 15/1851; G06K 15/1868; G06T 3/40; G06T 11/60; H04N 7/0135; Y10S 345/948; G06F 17/214
USPC .......... 358/1.1, 1.2, 1.9, 2.1, 3.12, 537, 538, 358/450–453, 462; 382/298; 345/660, 671
See application file for complete search history.

(56) References Cited

U.S. PATENT DOCUMENTS

| | | | |
|---|---|---|---|
| 5,825,987 A * | 10/1998 | Asada | G06K 15/02 358/1.11 |
| 7,336,378 B2 | 2/2008 | Ichikawa et al. | |
| 8,634,674 B2 * | 1/2014 | Hanechak | G06T 3/0006 358/1.15 |
| 2002/0036788 A1 * | 3/2002 | Hino | G06F 17/214 358/1.11 |
| 2002/0040375 A1 * | 4/2002 | Simon | G06T 11/60 715/251 |
| 2002/0048032 A1 * | 4/2002 | Ichikawa | H04N 1/3875 358/1.11 |
| 2004/0051893 A1 * | 3/2004 | Yoshida | G06K 15/02 358/1.11 |
| 2012/0002226 A1 * | 1/2012 | Zhan | G06F 3/1205 358/1.11 |

FOREIGN PATENT DOCUMENTS

JP 2002-077598 A 3/2002

* cited by examiner

*Primary Examiner* — Chad Dickerson
(74) *Attorney, Agent, or Firm* — Studebaker & Brackett PC (57) ABSTRACT

A segment extracting section extracts, from a document image, a segment that is an image region containing a series of text characters of a uniform size from a document image. When the segment extracting section extracts a plurality of segments, a segment designating section designates one or more of the extracted segments each as an enlargement segment according to text sizes of the respective extracted segments. A scaling-factor determining section determines a scaling factor for each enlargement segment based on the text size of the enlargement segment and a standard text size. An image creating section enlarges each enlargement segment at the scaling factor determined for the enlargement segment and creates a page image including each enlargement segment as enlarged and each non-enlargement segment that is an undesignated segment among the extracted segments.

6 Claims, 5 Drawing Sheets

IMAGE PROCESSING DEVICE AND IMAGE FORMING APPARATUS

INCORPORATION BY REFERENCE

The present application claims priority under 35 U.S.C. §119 to Japanese Patent Application No. 2014-089666, filed Apr. 23, 2014. The contents of this application are incorporated herein by reference in their entirety.

BACKGROUND

The present disclosure relates to image processing devices and image forming apparatuses. Some image processing devices enlarge an image at a scaling factor input by a user.

SUMMARY

An image processing device according to the present disclosure includes a segment extracting section, a segment designating section, a scaling-factor determining section, and an image creating section. The segment extracting section extracts, from a document image, a segment that is an image region containing a series of text characters of a uniform size. When the segment extracting section extracts a plurality of segments, the segment designating section designates one or more of the extracted segments each as an enlargement segment according to text sizes of the respective extracted segments. The scaling-factor determining section determines a scaling factor for each of the one or more enlargement segments based on the text size of the enlargement segment and a standard text size. The image creating section enlarges each of the one or more enlargement segments at the scaling factor determined for the enlargement segment and creates a page image including the one or more enlargement segments as enlarged and one or more non-enlargement segments that are each an undesignated segment among the extracted segments.

An image forming apparatus according to the present disclosure includes the image processing device described above.

DETAILED DESCRIPTION

Figure 1:
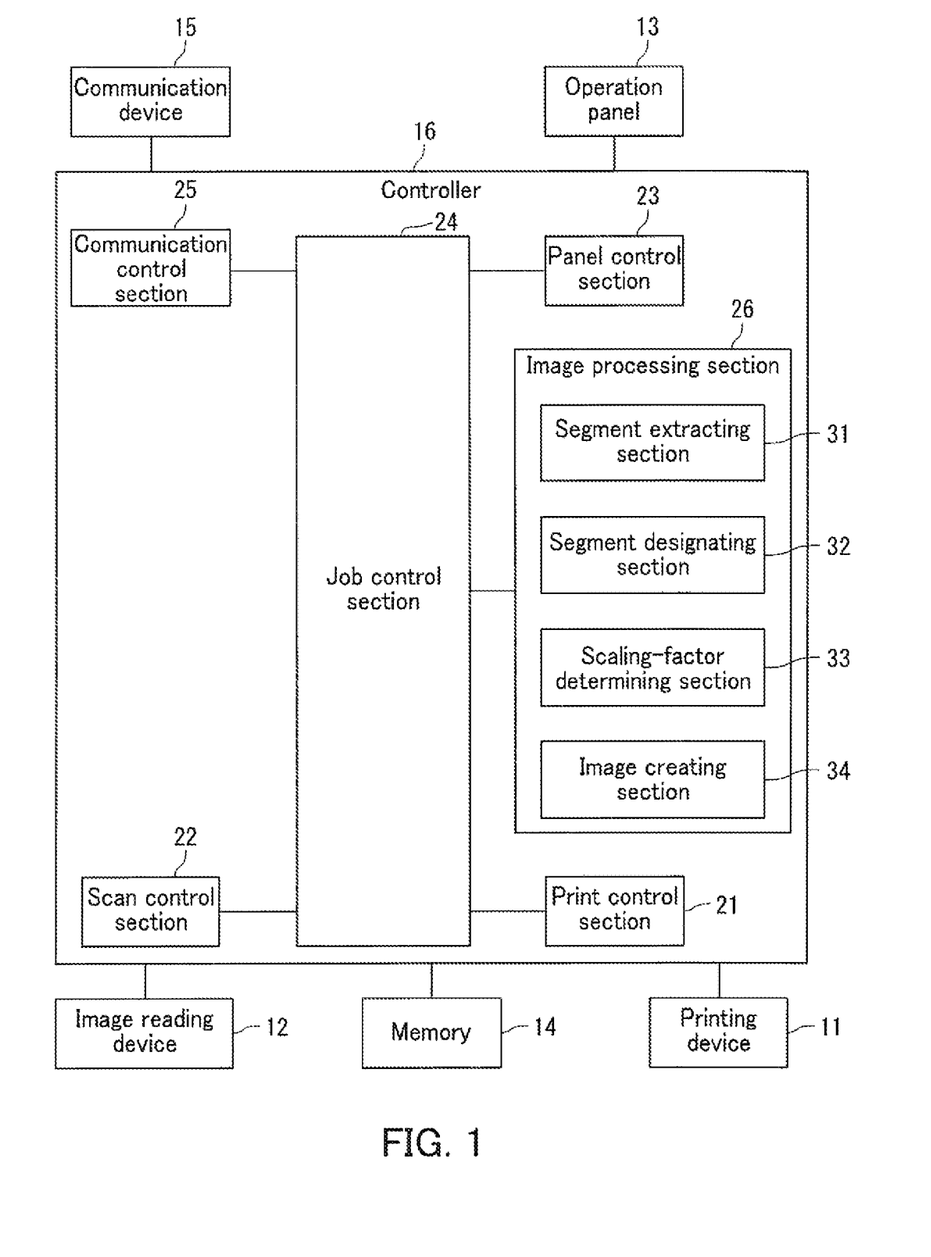
FIG. 1 is a block diagram showing the structure of an image forming apparatus that includes an image processing device according to an embodiment of the present disclosure.

The following describes embodiments of the present disclosure with reference to the drawings.
Embodiment 1
FIG. 1 is a block diagram showing the structure of an image forming apparatus that includes an image processing device according to an embodiment of the present disclosure. The image forming apparatus shown in FIG. 1 has a printer function and a scanner function. The image forming apparatus shown in FIG. 1 includes a printing device 11, an image reading device 12, an operation panel 13, a memory 14, a communication device 15, and a controller 16.

The printing device 11 is an internal device for printing page-by-page images of print data on printing sheets. In the present embodiment, the printing device 11 uses electrophotography to print images. Print data is raster image data, such as joint photographic experts group (JPEG) image data. Raster image data is generated by scanning an image of an original document by the image reading device 12. Raster image data is also generated based on page description language (PDL) data. Raster image data is also generated when a facsimile transmission is received by an unillustrated facsimile machine included in the image forming apparatus.

The image reading device 12 is an internal device that optically reads images of a document on a page-by-page basis. The image reading device 12 generates image data representing images of the respective pages read.

The operation panel 13 is disposed on a housing surface of the image forming apparatus. The operation panel 13 includes a display device for presenting information to a user. The operation panel 13 also includes an input device that detects user's operations made thereon. The display device may be a liquid crystal display, for example. The input device may be key switches and a touch panel, for example.

The memory 14 temporarily stores image data and other data at the time of job execution by the image forming apparatus. The memory 14 is a semiconductor memory, for example. Specifically, the memory 14 may be a dynamic random access memory (DRAM), which is volatile.

The communication device 15 is connected to a computer network, which is not shown in the figures. The communication device 15 is a circuit that performs data transmission to and from another device (such as a host device) connected to the network.

The controller 16 is formed from a microcomputer or an application specific integrated circuit (ASIC). The controller 16 implements various processing sections. In this embodiment, the controller 16 implements a print control section 21, a scan control section 22, a panel control section 23, a job control section 24, a communication control section 25, and an image processing section 26.

The print control section 21 controls the printing device 11 to perform printing based on print data.

The scan control section 22 controls the image reading device 12. More specifically, the scan control section 22 causes the image reading device 12 to read images of a document (printed matter) on a page-by-page basis. The scan control section 22 generates raster image data of each image of a document page read by the image reading device 12.

The panel control section 23 controls the operation panel 13. More specifically, the panel control section 23 causes the operation panel 13 to display various pieces of information. The panel control section 23 also receives user's operations made on the operation panel 13.

The job control section 24 receives a job request from an unillustrated host device via the communication device 15 and the communication control section 25. The job control section 24 also receives a job request according to user's operations made on the operation panel 13. Upon recipe of a job request by the job control section 24, the print control section 21 causes the printing device 11 to execute the requested job, for example. In another example, the scan control section 22 causes the image reading device 12 to execute the requested job. More specifically, when a print job request that is described in PDL is received from the unillustrated host device, the job control section 24 generates raster image data from the print job request. The print control section 21 causes the printing device 11 to print images based on the resulting raster image data.

The communication control section 25 controls the communication device 15 to receive a job request from the host device and transmit notifications to the host device.

The image processing section 26 performs various processing on images to be printed or on images obtained by image reading.

The image processing section 26 includes a segment extracting section 31, a segment designating section 32, a scaling-factor determining section 33, and an image creating section 34.

The segment extracting section 31 extracts a segment that is an image region containing a series of text characters of a uniform size from the image of each document page. In the following description, the image of each document page may be referred to as a document image.

The segment extracting section 31 detects text characters from a document image using optical character recognition (OCR), for example. Next, the segment extracting section 31 extracts a series of text characters of a uniform size that are adjacent to one another with a distance less than a predetermined spacing. Next, the segment extracting section 31 extracts a rectangle region circumscribing the series of text characters as one segment. In the present embodiment, the segment extracting section 31 detects the size of each text character (hereinafter, referred to as a text size) from discrete sizes by 1 point increment, for example.

When the segment extracting section 31 extracts a plurality of segments, the segment designating section 32 designates as an enlargement segment, one or more of the extracted segments based on the text sizes of the respective segments.

In Embodiment 1, the segment designating section 32 causes the operation panel 13 to display, on the display device, the segments extracted by the segment extracting section 31. This allows a user to select one of the segments displayed on the display device by operating the operation panel 13. In response to the selection by a user of one of the segments, the segment designating section 32 designates every segment having a text size no larger than the text size of the selected segment. For example, when a user touches the display device to select a segment or a text character contained in a segment, the touch sensitive operation panel 13 detects the touch and designates one or more enlargement segments based on the segment corresponding to the touch point.

The scaling-factor determining section 33 determines the scaling factor to be applied to each the one or more enlargement segments based on a text size F1 and a text size F2. The text size F1 indicates the text size of each of the one or more enlargement segments. The text size F2 indicates the smallest text size among the text characters that are contained in the one or more segments other than the enlargement segments and that have a text size larger than the text size F1. The text size F2 is one example of a standard text size. The scaling-factor determining section 33 determines the scaling factor to be applied to each of the one or more enlargement segments by the value of a ratio F2/F1. Each of the one or more enlargement segments is enlarged vertically and horizontally according to the scaling factor determined for the enlargement segment.

For example, a user selects a segment that contains text characters of a size "not readily legible (6 point, for example)" from among the segments displayed on the display device. The segment designating section 32 stores the text size of a segment selected by a user as containing text characters of a size "not readily legible". Then, the segment designating section 32 specifies a text size that is "readily legible" by selecting the smallest text size among the text characters that are contained in the segments other than the user-selected segment and that have a text size larger than the text size "not readily legible" (that is, the smallest text size from among text characters contained in the other segments, 10 points, for example).

The image creating section 34 enlarges each the one or more enlargement segments at the scaling factor determined for the segment by the scaling-factor determining section 33. The image creating section 34 creates a page image including the one or more enlargement segments as enlarged and one or more non-enlargement segments (that are segments other than the enlargement segments among the plurality of extracted segments).

The image creating section 34 determines whether each of the enlargement segments overlaps with an adjacent segment (or whether the distance between the two segments is less than a predetermine spacing). On determining that any enlargement segment as enlarged overlaps with an adjacent segment (or that the distance between the two segments is less than the predetermine spacing), the image creating section 34 shifts the adjacent segment to a position not overlapping with the enlargement segment (or to a position at least the predetermined spacing away from the enlargement segment).

Figure 2:
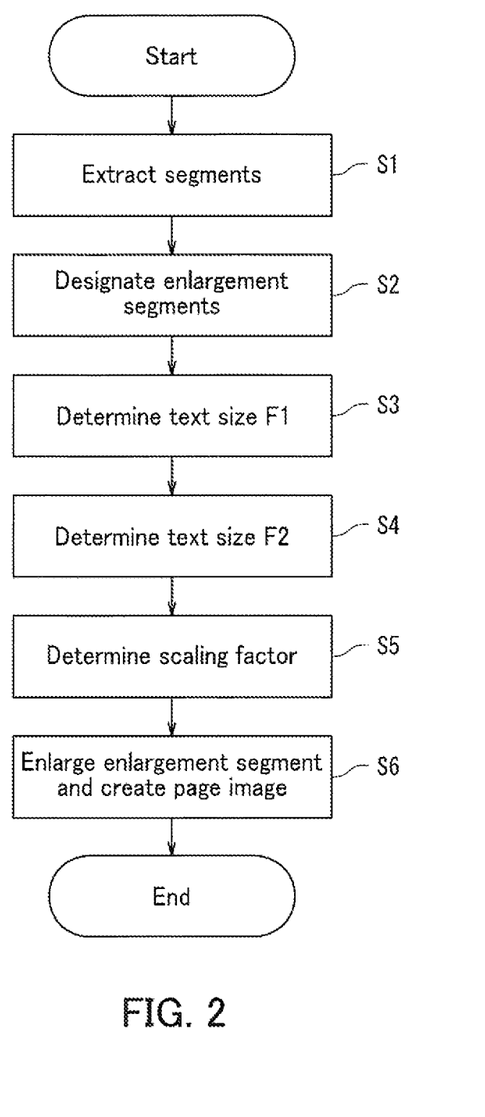
FIG. 2 is a flowchart of processing performed by the image forming apparatus shown in FIG. 1.

Next, the following describes the above-described operation performed by the image forming apparatus. FIG. 2 is a flowchart of operations performed by the image forming apparatus shown in FIG. 1.

First, the segment extracting section 31 extracts text character segments from a document image (Step S1). Next, the segment designating section 32 designates, each as an enlargement segment, one or more of the segments extracted by the segment extracting section 31 (Step S2).

Next, the scaling-factor determining section 33 determines the text size F1 for each of the one or more enlargement segments (Step S3). Next, the scaling-factor determining section 33 determines the text size F2 (Step S4). Next, the scaling-factor determining section 33 determines a scaling factor for each of the one or more enlargement segments based on the text size F1 and the text size F2 (Step S5).

Next, the image creating section 34 enlarges each of the one or more enlargement segments at the scaling factor determined for the enlargement segment. Next, the image creating section 34 creates a page image that includes the one or more enlargement segments as enlarged and the one or more non-enlargement segments (Step S6).

Figure 3:
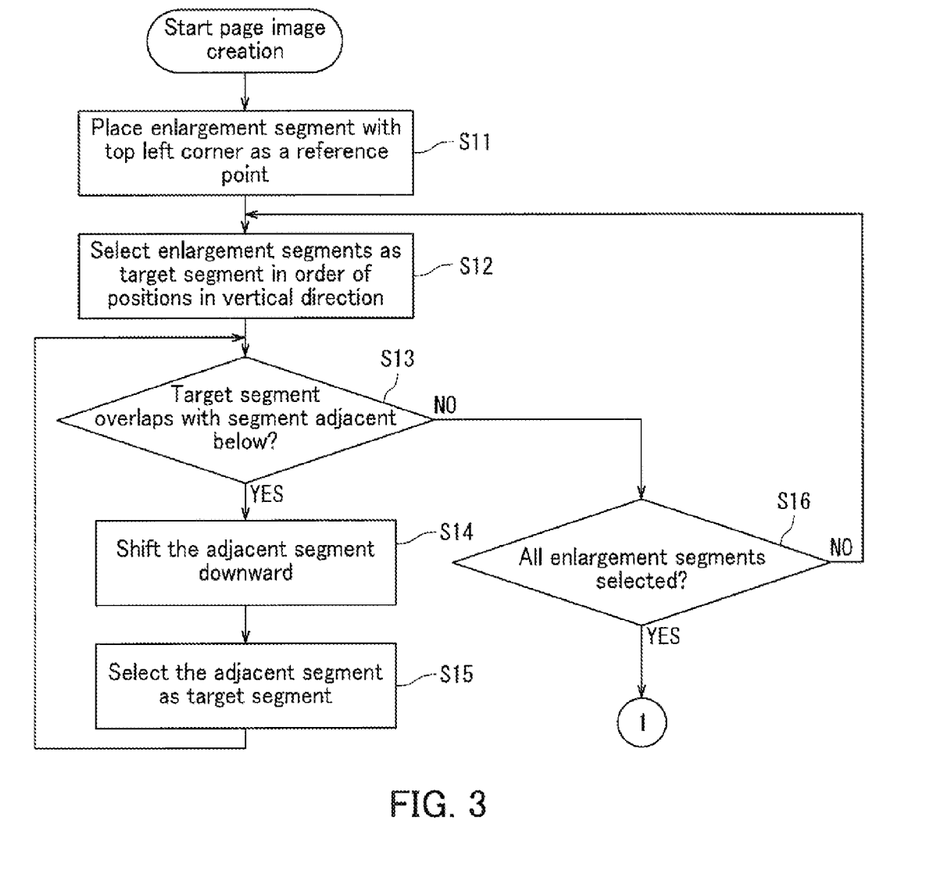
FIG. 3 is a flowchart that details the step of creating a page image shown in FIG. 2.
Figure 4:
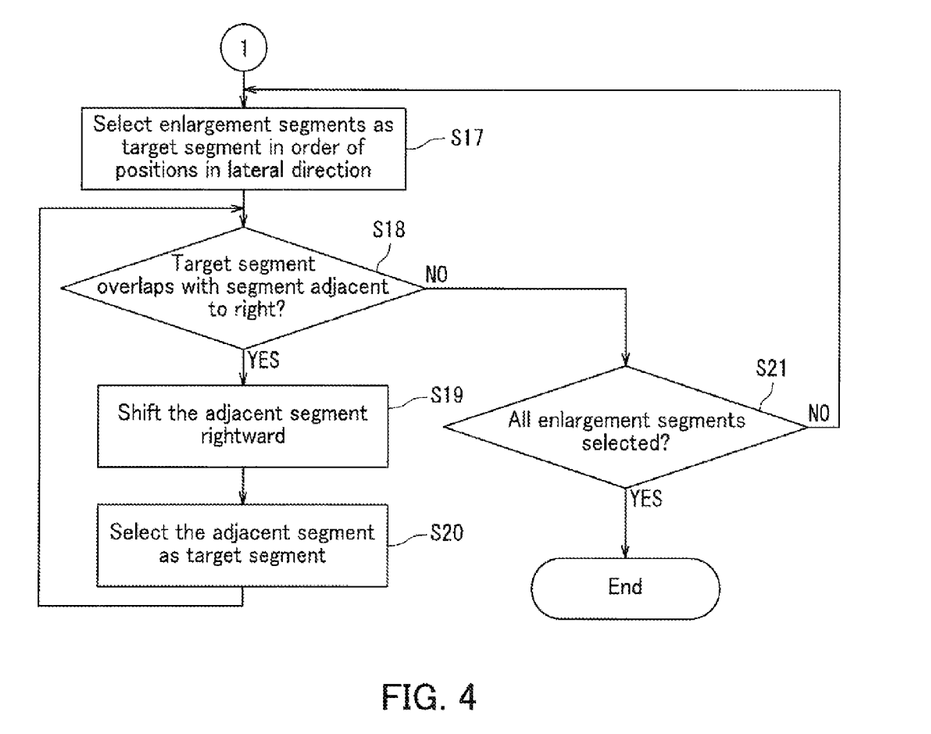
FIG. 4 is a flowchart that details the step of creating an image shown in FIG. 2.
Figure 5:
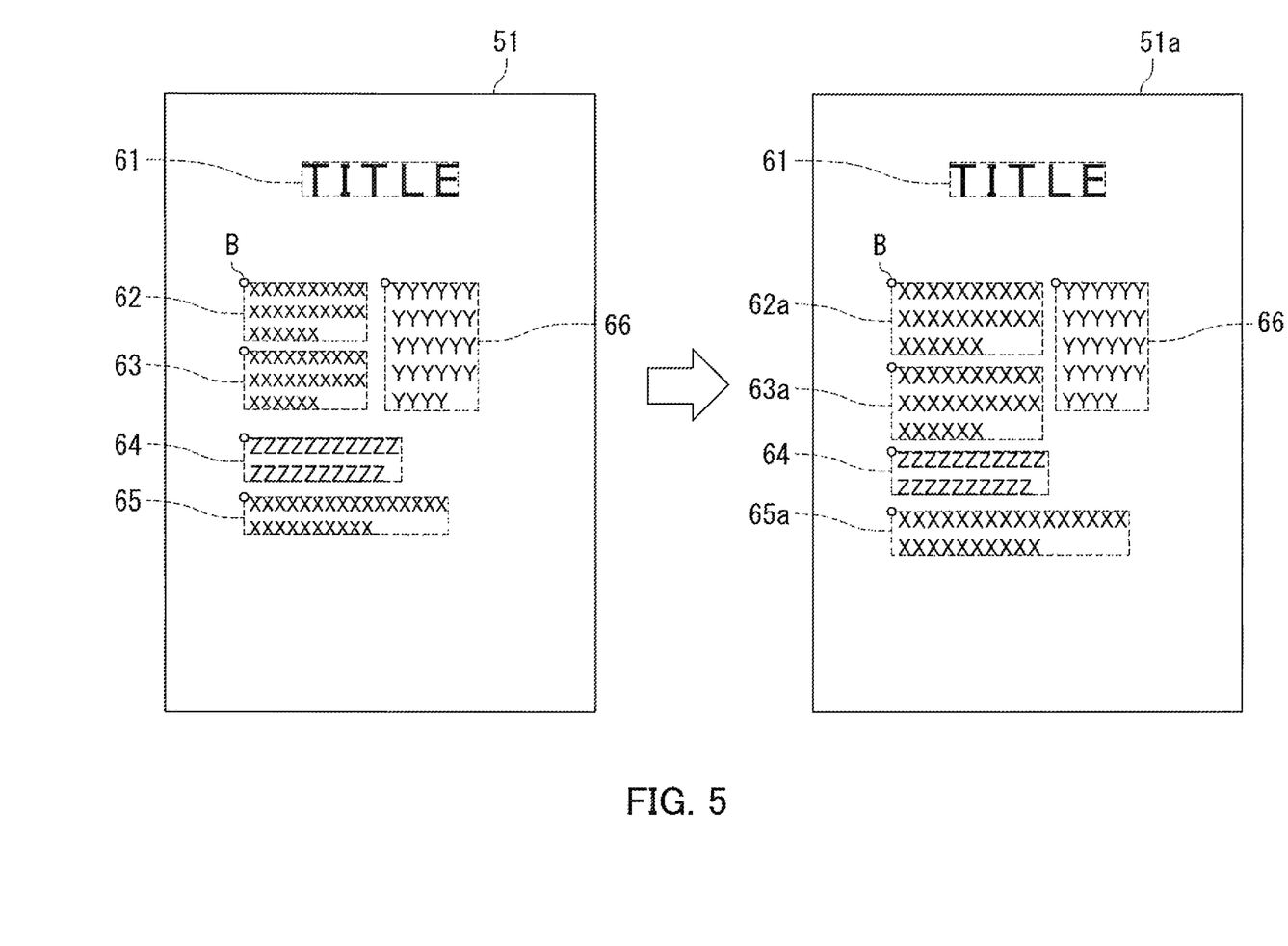
FIG. 5 is an example a page image created by enlarging segments of a document image according to the embodiment of the present disclosure.

Next, the page image creation process performed by the image creating section 34 will be described in detail with reference to FIGS. 3 and 4. FIGS. 3 and 4 each show part of a flowchart of detailed flow of the page image creation (Step S6) shown in FIG. 2. FIG. 5 shows one example of a page image 51a that is created by enlarging one or more segments of a document image 51. The following description is directed to an example in which the document image 51 includes a plurality of enlargement segments and a plurality of non-enlargement segments.

As shown in FIG. 3, the image creating section 34 creates a page image by first placing the respective non-enlargement segments at the same positions in the page image as in the document image 51. The image creating section 34 then places each enlargement segment as enlarged such that a reference point B of the enlargement segment is located at the same position in the page image as in the document image 51 (Step S11). Note that the reference point B of a segment is a top left corner of the segment.

Next, the image creating section 34 sequentially selects the enlargement segments as a target segment in the order of the positions of the respective reference points B starting from the top in the vertical direction (Step S 12).

In the example shown in FIG. 5, five segments 61 to 66 are extracted from the document image 51. The segments 62, 63, and 65 are designated as enlargement segments, whereas the segments 61, 64, and 66 are non-enlargement segments. In addition, segments 62a, 63a, and 65a are enlarged segments of the segments 62, 63, and 65, respectively. Consequently, the image creating section 34 first selects the segment 62a as a target segment.

As shown in FIG. 3, the image creating section 34 determines whether the target segment overlaps with an adjacent segment below the target segment (or whether the distance between the two segments is less than the predetermine spacing) (Step S13).

For making the determination, the image creating section 34 first specifies, as a "downward adjacent segment", an adjacent segment below the target segment. The "downward adjacent segment" is a segment that overlaps at least partially with the target segment in their horizontal positions. In addition, the "downward adjacent segment" is a segment having the reference point B that is closest to the reference point B of the target segment from among the segments having the reference points B located below the reference point B of the target segment.

On determining in Step S13 that the target segment overlaps with the downward adjacent segment (or that the distance between the two segments is less than the predetermine spacing), the image creating section 34 shifts the downward adjacent segment downward to a position not overlapping with the target segment (or to a position at least the predetermine spacing away from the target segment) (Step S14). Next, the image creating section 34 selects the shifted segment as a new target segment (Step S15) and the processing goes back to Step S13.

On determining in Step S13 that the target segment does not overlap with a downward adjacent segment (or that the distance between the two segments is less than the predetermine spacing), the image creating section 34 then determines whether or not all the enlargement segments have been selected as a target segment in Step S12 (Step S16). When any of the enlargement segments is not selected yet, the processing goes back to Step S12 in which the image creating section 34 selects another enlargement segment as a new target segment. On the other hand, when none of the enlargement segments remains unselected, the processing goes back to Step S17 shown in FIG. 4.

In the example shown in FIG. 5, the image creating section 34 first selects the enlarged segment 62a as a target segment (Step S12). Next, the image creating section 34 determines that the enlarged segment 62a overlaps with the enlarged segment 63a (Step S13). Next, the image creating section 34 shifts the enlarged segment 63a downward (Step S14). Next, the image creating section 34 selects the enlarged segment 63a as a new target segment (Step S15). Next, the image creating section 34 determines that the enlarged segment 63a overlaps with the segment 64 (Step S13). Next, the image creating section 34 shifts the segment 64 downward (Step S14). Next, the image creating section 34 selects the segment 64 as a new target segment (Step S15). Next, the image creating section 34 determines that the segment 64 overlaps with the enlarged segment 65a (Step S13). Next, the image creating section 34 shifts the enlarged segment 65a downward (Step S14).

Through the above processing steps, the image creating section 34 creates the page image 51a in which none of the enlargement segments as enlarged overlaps with a downward adjacent segment (or in which the distance between any two adjacent segments is less than the predetermine spacing) in the vertical direction.

Next, as shown in FIG. 4, the image creating section 34 sequentially selects the enlargement segments as a target segment in the order of the positions of the respective reference points B starting from the left in the horizontal direction (Step S17).

In the example shown in FIG. 5, the reference points B of the segments 62, 63, and 65 are all located at the same horizontal position. In the following description, the image creating section 34 sequentially selects, as a target segment, the segments 62, 63, and 65 in the stated order.

The image creating section 34 determines whether the target segment overlaps with a segment adjacent to the right of the target segment (or whether the distance between the two segments is less than a predetermined length) (Step S18).

The image creating section 34 first specifies, as a "rightward adjacent segment", a segment adjacent to the right of the target segment. The "rightward adjacent segment" is a segment that overlaps at least partially with the target segment in their vertical positions. In addition, the "rightward adjacent segment" is a segment having the reference point B that is closest to the reference point B of the target segment from among the segments having the reference points B located to the right of the reference point B of the target segment.

On determining in Step S18 that the target segment overlaps with the rightward adjacent segment (or that distance between the two segments is less than the predetermine spacing), the image creating section 34 shifts the rightward adjacent segment rightward to a position not overlapping with the target segment (or to a position at least the predetermine spacing away from the target segment) (Step S19). Next, the image creating section 34 selects the shifted segment as a new target segment (Step S20) and the processing goes back to Step S18.

On determining in Step S18 that the target segment does not overlap with the rightward adjacent segment (or that the distance between the two segments is less than the predetermine spacing), the image creating section 34 then determines whether or not all the enlargement segments have been selected as a target segment in Step S17 (Step S21). When any of the enlargement segments is not yet selected, the processing goes back to Step S17 in which the image creating section 34 selects another enlargement segment as a new target segment. On the other hand, when none of the enlargement segments remains unselected, the processing ends.

In the example shown in FIG. 5, the image creating section 34 first selects the enlarged segment 62a as a target segment (Step S17). Next, the image creating section 34 determines that the enlarged segment 62a overlaps with the segment 66 (Step S18). Next, the image creating section 34 shifts the segment 66 rightward (Step S19). Next, the image creating section 34 selects the segment 66 as a new target segment (Step S20). Since no segment is present to the right of the segment 66, the image creating section 34 determines that the target segment does not overlap with a rightward adjacent segment (Step S18).

Through the above processing steps, the image creating section 34 creates the page image 51a in which none of the enlargement segments as enlarged overlaps with a horizontally adjacent to the enlargement segment (or in which the distance between any two adjacent segments is less than the predetermine spacing) in the horizontal direction.

According to Embodiment 1 as described above, the segment extracting section 31 extracts a segment that is an image region containing a series of text characters of a uniform size from a document image. When the segment extracting section 31 extracts a plurality of segments, the segment designating section 32 designates one or more of the extracted enlargement segments each as an enlargement according to the text sizes of the respective extracted segments. The scaling-factor determining section 33 determines a scaling factor for each enlargement segment based on the text size F1 of the enlargement segment and the text size F2. As described above, the text size F2 is the smallest text size among the text characters that are contained in the one or more segments other than the enlargement segments and that have a text size larger than the text size F1. The image creating section 34 enlarges each enlargement segment at the scaling factor determined for that enlargement segment. The image creating section 34 then creates a page image 51a including each of the one or more enlargement segments as enlarged and the image of each of the one or more non-enlargement segments (the segments other than the one or more enlargement segments).

Consequently, the text characters contained in each of the one or more designated segments (enlargement segments) are enlarged to the text size that is smallest among text characters contained in the non-enlargement segments and having a larger text size the text size of any of the one or more designated segments. This ensures that text characters of a small size are enlarged at more appropriate scaling factors to improve the legibility, as compared with the case where the scaling factor is designated by a user.

In addition, the image creating section 34 exclusively enlarges text characters contained in each enlargement segment. Consequently, the size of the resulting image is kept smaller than a page image created by simply enlarging the entre document image.

Embodiment 2

In Embodiment 2 of the present disclosure, the settings may be made in advance by a user as to the "text size not readily legible" and/or "text size readily legible". The segment designating section 32 designates as an enlargement segment each segment containing text characters having a text size no larger than the "text size not readily legible" or each segment containing text characters having a text size smaller than the "text size readily legible".

For example, the "text size not readily legible" and/or the "text size readily legible" designated as in Embodiment 1 is stored into the memory 14. Then, in the processing of subsequent document images, the segment designating section 32 may designate enlargement segments based on the "text size not readily legible" and/or the "text size readily legible" stored in the memory 14. This eliminates the need for the text size designation by a user as in Embodiment 1.

In addition, the scaling-factor determining section 33 according to Embodiment 2 may determine the scaling factor for an enlargement segment based on the text size F1 of the enlargement segment and the "text size readily legible" in the case where the text size F2, which is a smallest text size from among those larger than the text size F1 of any enlargement segment, is smaller than the "text size readily legible". In such a case, the scaling-factor determining section 33 determines the scaling factor based on the ratio of the "text size readily legible" to F1 (text size readily legible/F1). Note that the text size readily legible is one example of the standard text size. Consequently, when a plurality of segments contain text characters no larger than the "text size not readily legible" (or contain text characters smaller than the "text size readily legible") and the text sizes of the receptive segments are mutually different, the respective segments are enlarged at different scaling factors (each equal to a ratio of the "text size readily legible"/the text size of the corresponding segment).

The "text size readily legible" may be designated by a user by selecting a segment from among a plurality of segments displayed on the operation panel 13.

The image forming apparatus of Embodiment 2 is basically identical to the image forming apparatus of Embodiment 1 in structure and operation. Therefore, a description thereof is omitted.

The embodiments described above are preferable examples of the present disclosure. However, the present disclosure is not limited to the specific embodiments, and various alterations and modifications may be made without departing from the gist of the present disclosure.

For example, Embodiments 1 and 2 may be altered to address the case where a page image created by the image creating section 34 is larger than a printable area of a printing sheet selected by a user. In such a case, the image creating section 34 may determines for each enlargement segment, a maximum permissible scaling factor for the resulting page image to fit within the printable area. The image creating section 34 then re-enlarges each enlargement segment at the maximum permissible scaling factor determined for the enlargement segment and creates a page image.

In addition, Embodiment 1 and 2 may be altered such that the image creating section 34 issues a warning message when the created page image is larger than the printable area of a printing sheet selected by a user. For example, the image creating section 34 may request the panel control section 23 to control the operation panel 13 so as to display menu items such as "Cancel", "Print at maximum permissible enlargement on selected sheet size", and "Continue", in addition to the warning message. Then, the image creating section 34 may proceed according to a menu item selected by a user from among the menu items displayed on the operation panel 13.

In addition, Embodiments 1 and 2 may be alerted to process a document image containing an object other than text characters (drawing, photograph, and the like) by configuring the image creating section 34 to determine such an object as a non-enlargement segment. Consequently, the object is included in a page image without enlargement.

What is claimed is:

1. An image processing device comprising:
   a segment extracting section that has an optical character recognition function and that is configured to
   detect text characters from a document image using the optical character recognition function,
   extract a series of text characters of a uniform size that are adjacent to one another among the text characters detected using the optical character recognition function,
   extract a rectangle region circumscribing the extracted text characters as a segment, extract a plurality of the segments, the respective segments containing text characters different in size from one another;
a segment designating section configured to
designate a plurality of enlargement segments,
cause the plurality of extracted segments to be displayed on a display device,
set, when one of the plurality of extracted segments displayed on the display device is selected by the user, a text size of the text character contained in the segment selected by the user; and
designates a plurality of segments each containing a text character having a text size equal to or smaller than the text size of the text character contained in the segment selected by the user among the plurality of extracted segments as the enlargement segments;
a scaling-factor determining section that determines a scaling factor for each of the enlargement segments, the scaling factor being a value of a ratio between the text size of the text character contained in each of the enlargement segments and a standard text size; and
an image creating section that
equalizes the text sizes of the text characters contained in the enlargement segments by enlarging each of the enlargement segments at the scaling factor determined for the enlargement segment and
creates a page image including the enlargement segments as enlarged and a plurality of non-enlargement segments other than the enlargement segments,
wherein the standard text size is determined by the scaling-factor determining section as a smallest text size among text sizes of text characters contained in respective non-enlargement segments not selected by the user other than the enlargement segments, wherein the standard text size is larger than the text size of the text character contained in the segment selected by the user.

2. The image processing device according to claim 1, wherein when, in the page image created, any of the enlargement segments as enlarged overlaps with an adjacent one of the segments, the image creating section shifts the adjacent segment to a position not overlapping with the enlargement segment, or
when, in the page image created, any of the enlargement segments as enlarged is away from an adjacent one of the segments with a distance less than a predetermined spacing, the image creating section shifts the adjacent segment to a position at least the predetermined spacing away from an enlarged image and creates the page image.

3. An image forming apparatus comprising: the image processing device according to claim 1.

4. The image processing device according to claim 1, wherein the page image include an object other than the text characters, and the object is not enlarged.

5. The image processing device according to claim 1, wherein when the page image created is larger than a printable area of a printing sheet, the image creating section notifies the user of the page image being larger than the printable area.

6. The image processing device according to claim 1, wherein when the page image created is larger than a printable area of a printing sheet, the image creating section determines, for each of the enlargement segments, a maximum permissible scaling factor for the page image created to fit within the printable area and creates the page image by enlarging each of the enlargement segments at the maximum permissible scaling factor determined for the enlargement segment.

* * * * *